United States Patent
Levine et al.

(10) Patent No.: US 12,221,071 B2
(45) Date of Patent: Feb. 11, 2025

(54) FLATBED VEHICLE ACCESSORY ASSEMBLY AND FLATBED VEHICLE CARGO MANAGEMENT METHOD

(71) Applicant: Ford Global Technologies, LLC, Dearborn, MI (US)

(72) Inventors: Eric S. Levine, Novi, MI (US); Matthew B. Rutman, Canton, MI (US); Vincent Anthony Chimento, Plymouth, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 17/716,071

(22) Filed: Apr. 8, 2022

(65) Prior Publication Data
US 2023/0111208 A1 Apr. 13, 2023

Related U.S. Application Data

(60) Provisional application No. 63/254,317, filed on Oct. 11, 2021.

(51) Int. Cl.
*B60R 9/06* (2006.01)
*B60P 7/08* (2006.01)
*B60P 7/10* (2006.01)

(52) U.S. Cl.
CPC ............ *B60R 9/065* (2013.01); *B60P 7/0807* (2013.01); *B60P 7/10* (2013.01)

(58) Field of Classification Search
CPC .......... B60R 9/065; B60P 7/0807; B60P 7/10; B62D 63/025
See application file for complete search history.

(56) References Cited

U.S. PATENT DOCUMENTS

| | | | | |
|---|---|---|---|---|
| 4,842,326 A | * | 6/1989 | DiVito | B60P 3/42 296/10 |
| 4,942,968 A | * | 7/1990 | Fast | A47F 5/005 211/184 |
| 5,599,055 A | * | 2/1997 | Brown | B62D 25/2054 410/97 |
| 5,976,672 A | * | 11/1999 | Hodgetts | B60R 13/01 428/116 |
| 6,581,788 B1 | * | 6/2003 | Winig | F16B 12/26 211/183 |
| 6,648,569 B2 | * | 11/2003 | Douglass | B60P 7/0892 410/46 |
| 6,941,654 B1 | * | 9/2005 | Sears | B21D 5/00 296/37.6 |
| 7,055,454 B1 | * | 6/2006 | Whiting | B62K 19/40 114/364 |

(Continued)

OTHER PUBLICATIONS

US 10,947,009 B2, 03/2021, Brunner et al. (withdrawn)

*Primary Examiner* — Justin M Larson
(74) *Attorney, Agent, or Firm* — Vichit Chea; Carlson, Gaskey & Olds, P.C.

(57) ABSTRACT

A modular cargo management system for a flatbed vehicle includes a flatbed of a vehicle, at least one accessory assembly, and an attachment system that secures the at least one accessory assembly to the flatbed. The attachment system has feet that are each received within an aperture when the accessory assembly is secured to the flatbed.

24 Claims, 4 Drawing Sheets

(56) References Cited

U.S. PATENT DOCUMENTS

| | | | | |
|---|---|---|---|---|
| 7,083,051 | B2* | 8/2006 | Smith | H04Q 1/023 248/220.42 |
| 7,462,951 | B1 | 12/2008 | Baarman | |
| 7,891,617 | B2* | 2/2011 | Tisbo | A47F 5/0853 248/300 |
| 8,205,910 | B2* | 6/2012 | Leonard | B60N 2/01575 280/781 |
| 8,622,266 | B2* | 1/2014 | McMillan | B60R 3/007 224/323 |
| 8,827,088 | B1* | 9/2014 | Krause | A61L 2/00 211/85.13 |
| 9,434,292 | B2* | 9/2016 | Welch | B62D 33/02 |
| 9,604,677 | B2* | 3/2017 | McKinney | B60R 9/02 |
| 9,636,429 | B2* | 5/2017 | Cushion | A61B 50/34 |
| 10,029,603 | B2* | 7/2018 | Stocks | B62D 63/025 |
| 10,479,427 | B2 | 11/2019 | Scaringe et al. | |
| 10,513,228 | B2* | 12/2019 | Steele | E06B 1/52 |
| 10,557,275 | B2* | 2/2020 | Lescord | E04G 1/36 |
| 10,583,962 | B2 | 3/2020 | Brunner et al. | |
| 10,647,267 | B2* | 5/2020 | Briggs | B60R 13/01 |
| 10,703,534 | B2 | 7/2020 | Brunner et al. | |
| D895,966 | S | 9/2020 | Brunner et al. | |
| D895,967 | S | 9/2020 | Brunner et al. | |
| D896,517 | S | 9/2020 | Brunner et al. | |
| D896,518 | S | 9/2020 | Brunner et al. | |
| D897,103 | S | 9/2020 | Brunner et al. | |
| D898,320 | S | 10/2020 | Brunner et al. | |
| 10,850,659 | B2* | 12/2020 | Stocks | B62D 63/025 |
| 10,870,453 | B2* | 12/2020 | Elder | B60R 9/052 |
| 10,962,218 | B2 | 3/2021 | Plato et al. | |
| 10,981,696 | B2 | 4/2021 | Brunner et al. | |
| D917,977 | S | 5/2021 | Brunner et al. | |
| D918,584 | S | 5/2021 | Brunner et al. | |
| D919,296 | S | 5/2021 | Brunner et al. | |
| 11,008,136 | B2 | 5/2021 | Brunner et al. | |
| 11,027,883 | B1 | 6/2021 | Brunner et al. | |
| D920,671 | S | 7/2021 | Brunner et al. | |
| D923,935 | S | 7/2021 | Brunner et al. | |
| 11,186,231 | B1* | 11/2021 | Smith | B60R 11/06 |
| 11,192,690 | B1 | 12/2021 | Brunner et al. | |
| 11,214,202 | B2 | 1/2022 | Carbone et al. | |
| 11,268,691 | B2 | 3/2022 | Plato et al. | |
| 11,307,596 | B2* | 4/2022 | Mackin | H04L 67/125 |
| 11,365,026 | B2 | 6/2022 | Brunner et al. | |
| 11,427,382 | B2 | 8/2022 | Brunner et al. | |
| 11,465,545 | B2* | 10/2022 | Glatfelter | B62D 63/025 |
| 11,465,805 | B2 | 10/2022 | Brunner et al. | |
| 11,577,661 | B2* | 2/2023 | Reband | B60R 7/08 |
| 11,623,581 | B2* | 4/2023 | Flatebo | B60R 9/065 414/800 |
| 11,964,632 | B2* | 4/2024 | Rutman | B60P 7/0815 |
| 2003/0170090 | A1* | 9/2003 | Douglas | B60P 1/003 410/91 |
| 2008/0029666 | A1* | 2/2008 | Hurt | A47F 5/0815 248/220.41 |
| 2016/0229356 | A1* | 8/2016 | Nolan | B60R 11/06 |
| 2019/0225371 | A1* | 7/2019 | Hoppe | B25H 3/023 |
| 2020/0147781 | A1* | 5/2020 | Squiers | A45F 3/047 |
| 2021/0080974 | A1 | 3/2021 | Mackin et al. | |
| 2023/0109950 | A1* | 4/2023 | Rutman | B60R 16/0215 307/10.1 |
| 2023/0110428 | A1* | 4/2023 | Rutman | B60R 11/06 414/462 |
| 2023/0111208 | A1* | 4/2023 | Levine | B60P 7/10 224/401 |
| 2023/0111839 | A1* | 4/2023 | Rutman | B60P 7/0815 224/403 |
| 2023/0115814 | A1* | 4/2023 | Thomas | H02J 7/0044 307/104 |
| 2023/0116745 | A1* | 4/2023 | Salter | B60P 7/0815 248/542 |
| 2023/0128666 | A1* | 4/2023 | Parrilla | B62D 63/025 296/193.04 |

\* cited by examiner

FLATBED VEHICLE ACCESSORY ASSEMBLY AND FLATBED VEHICLE CARGO MANAGEMENT METHOD

CROSS-REFERENCE TO RELATED APPLICATIONS

This application claims priority to U.S. Provisional Application No. 63/254,317, which was filed on 11 Oct. 2021 and is incorporated herein by reference.

TECHNICAL FIELD

This disclosure relates generally to an accessory assembly of a vehicle and, more particularly, to using accessory assemblies to partition areas of a flatbed.

BACKGROUND

Vehicles transport various types of cargo. A user can, for example, rely on a vehicle to transport items, such as containers and tools, to and from a jobsite. The items that need to be transported can vary based on the tasks the user performs at the jobsite.

SUMMARY

In some aspects, the techniques described herein relate to a modular cargo management system for a flatbed vehicle, including: a flatbed of a vehicle; at least one accessory assembly; and an attachment system that secures the at least one accessory assembly to the flatbed, the attachment system having a plurality of feet that are each received within one of a plurality of apertures when the at least one accessory assembly is secured to the flatbed.

In some aspects, the techniques described herein relate to a modular cargo management system, wherein the at least one accessory assembly provides a cargo bed sidewall when the at least one accessory assembly is secured to the flatbed.

In some aspects, the techniques described herein relate to a modular cargo management system, wherein the at least one accessory assembly includes a hinged lid.

In some aspects, the techniques described herein relate to a modular cargo management system, wherein the at least one accessory assembly includes a slidable tray.

In some aspects, the techniques described herein relate to a modular cargo management system, wherein the at least one accessory assembly is electrically coupled to the vehicle when the at least one accessory assembly is engaged with the flatbed.

In some aspects, the techniques described herein relate to a modular cargo management system, wherein the flatbed includes no sidewalls.

In some aspects, the techniques described herein relate to a modular cargo management system, wherein the at least one accessory assembly includes a wheel well.

In some aspects, the techniques described herein relate to a modular cargo management system, further including a floor of the flatbed, wherein, when the at least one accessory assembly is secured to the floor, the plurality of feet extend from a first side of the floor, through one of the plurality of apertures, and past an opposite, second side of the floor.

In some aspects, the techniques described herein relate to a modular cargo management system, wherein, when the at least one accessory assembly is engaged with the floor, enlarged collars of the plurality of feet capture respective portions of the floor to block withdrawal of the plurality of feet from the plurality of apertures.

In some aspects, the techniques described herein relate to a modular cargo management system, wherein the at least one accessory assembly is configured to engage the flatbed when the at least one accessory assembly is in a first position, and when the at least one accessory assembly is in a second position that is rotated relative to the first position.

In some aspects, the techniques described herein relate to a modular cargo management system, wherein a rotation of the at least one accessory assembly from the first position to the second position is rotation about a vertical axis.

In some aspects, the techniques described herein relate to a modular cargo management system, wherein the at least one accessory assembly is configured to engage the flatbed in a third position that is different than the first position and the second position, and further configured to engage the flatbed in a fourth position that is different than the first position, the second position, and the third position.

In some aspects, the techniques described herein relate to a modular cargo management method for a flatbed vehicle, including: receiving a plurality of feet of an accessory assembly within a plurality of apertures to secure the accessory assembly to a flatbed of a vehicle, the accessory assembly providing at least a portion of a cargo bed sidewall when the accessory assembly is secured to the flatbed.

In some aspects, the techniques described herein relate to a modular cargo management method, further including providing electrical power to the accessory assembly from the vehicle.

In some aspects, the techniques described herein relate to a modular cargo management method, wherein the accessory assembly includes a wheel well.

In some aspects, the techniques described herein relate to a modular cargo management method, wherein the accessory assembly includes a hinged lid.

In some aspects, the techniques described herein relate to a modular cargo management method, wherein the accessory assembly includes a slidable tray.

In some aspects, the techniques described herein relate to a modular cargo management method, wherein the accessory assembly is configured to engage the plurality of apertures in a floor of the flatbed when the accessory assembly is in a first position, the accessory assembly further configured to engage the plurality of apertures in the floor when the accessory assembly is in a different, second position where the accessory assembly is rotated relative to the first position, wherein rotation of the accessory assembly from the first position to the second position is a rotation about an axis that is normal to the floor.

In some aspects, the techniques described herein relate to a modular cargo management method, wherein the accessory assembly is configured to engage the plurality of apertures in a baseplate that is attached to the flatbed when the accessory assembly is in a first position, the accessory assembly further configured to engage the plurality of apertures in the baseplate when the accessory assembly is in a different, second position where the accessory assembly is rotated relative to the first position, wherein rotation of the accessory assembly from the first position to the second position is a rotation about an axis that is normal to the baseplate.

In some aspects, the techniques described herein relate to a modular cargo management method, further including capturing part of the flatbed between the plurality of feet and another portion of the accessory assembly when the accessory assembly is secured to the flatbed.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a modular cargo management system for a vehicle with a flatbed. The system is used to secure accessories to the vehicle. The system can include feet received within apertures.

Various types of accessories can be secured to the flatbed through the attachment system. This provides a user with a modular system that can quickly reconfigure a flatbed for a wide variety of uses.

Figure 1:
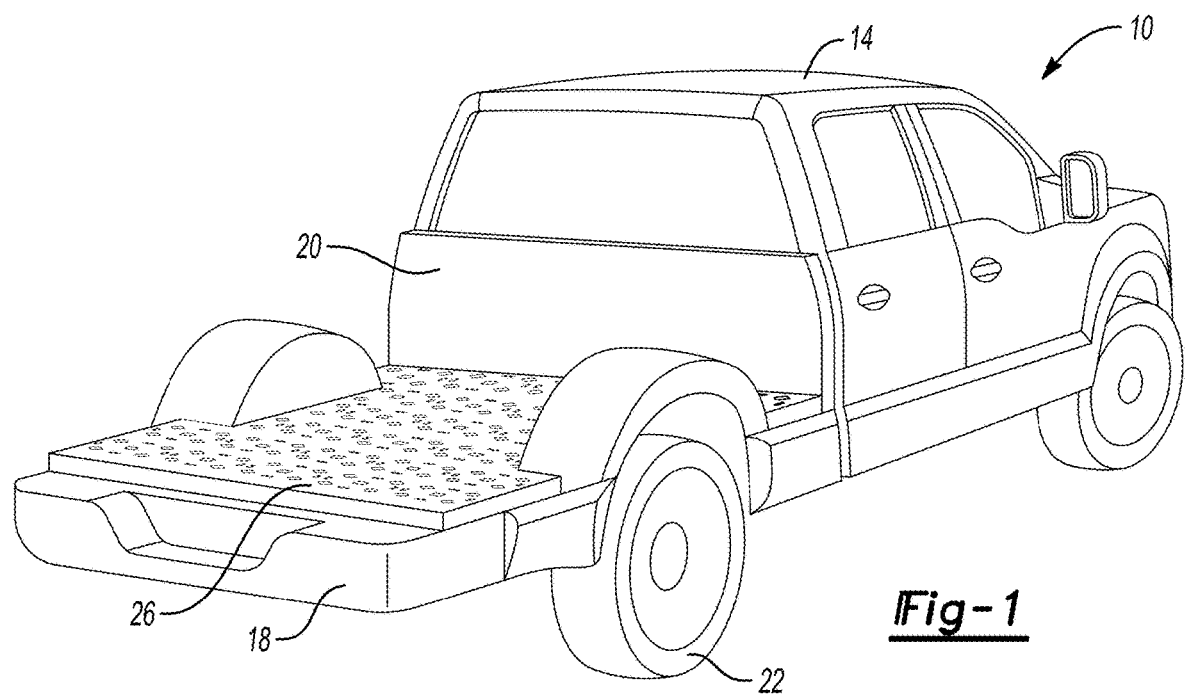
FIG. 1 illustrates a perspective view of a vehicle with a flatbed having a plurality of apertures that can be used to secure accessory assemblies according to an exemplary aspect of the present disclosure.
Figure 2:
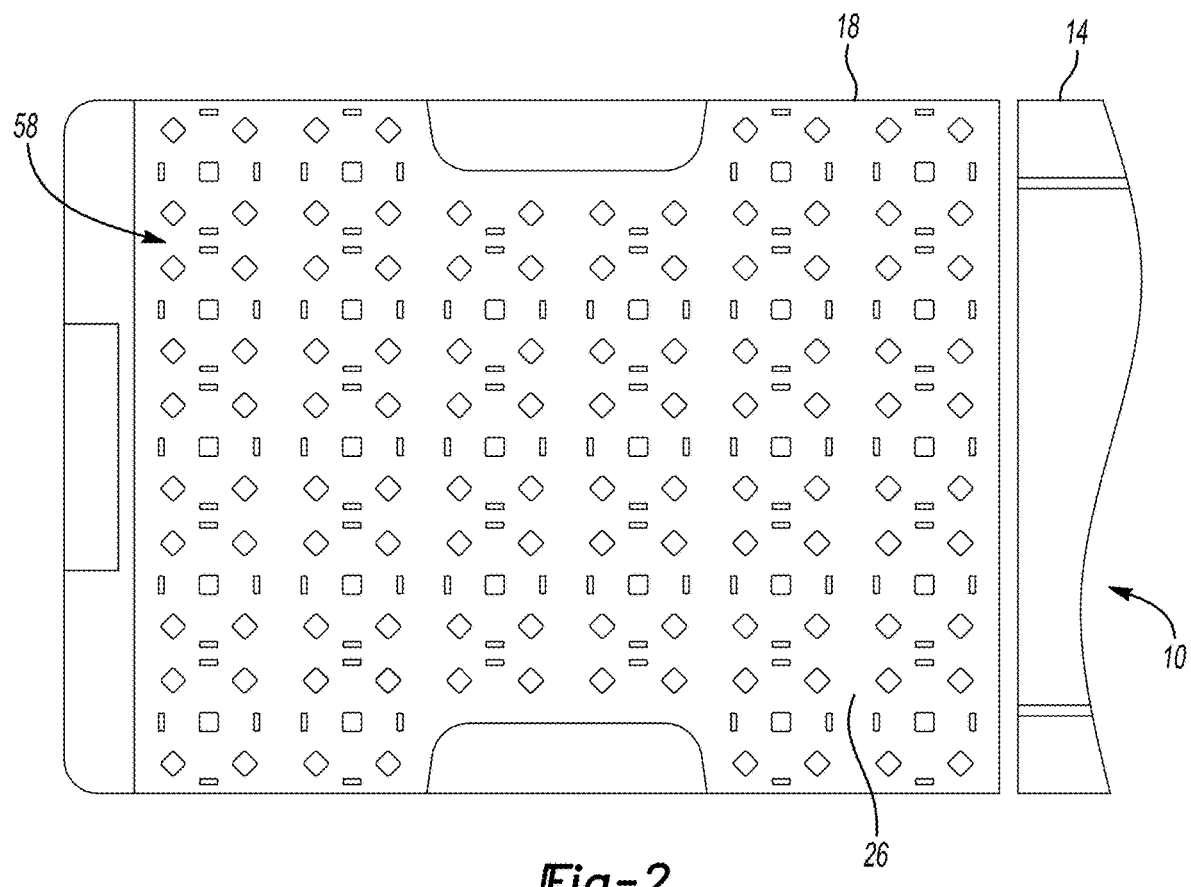
FIG. 2 illustrates a top view of the flatbed of FIG. 1.

With reference to FIGS. 1 and 2, a vehicle 10 includes a passenger compartment 14 and a flatbed 18 that is aft the passenger compartment 14. The flatbed 18 extends rearward from an aft wall 20 of the passenger compartment 14. The vehicle 10 is considered a flatbed vehicle at least because the flatbed area is open and lacks sidewalls and a tailgate. The vehicle 10 could be another type of vehicle in another example, such as a vehicle having cargo area with partial sides, a car, a van, a sport utility vehicle, etc.

The example vehicle 10 is an electrified vehicle and, in particular, a battery electric vehicle (BEV). In another example, the vehicle 10 could be another type of electrified vehicle, such as a hybrid electric vehicle (HEV), a plug-in hybrid electric vehicle (PHEV), or a conventional vehicle.

In particular, the example vehicle 10 includes an electrified powertrain capable of applying torque from an electric machine (e.g., an electric motor) to drive a pair of wheels 22. The vehicle 10 can include a traction battery pack, which powers the electric machine and, potentially, other electrical loads of the vehicle 10. The flatbed 18 includes a floor 26 that extends from rearward from the passenger compartment 14.

Figure 3:
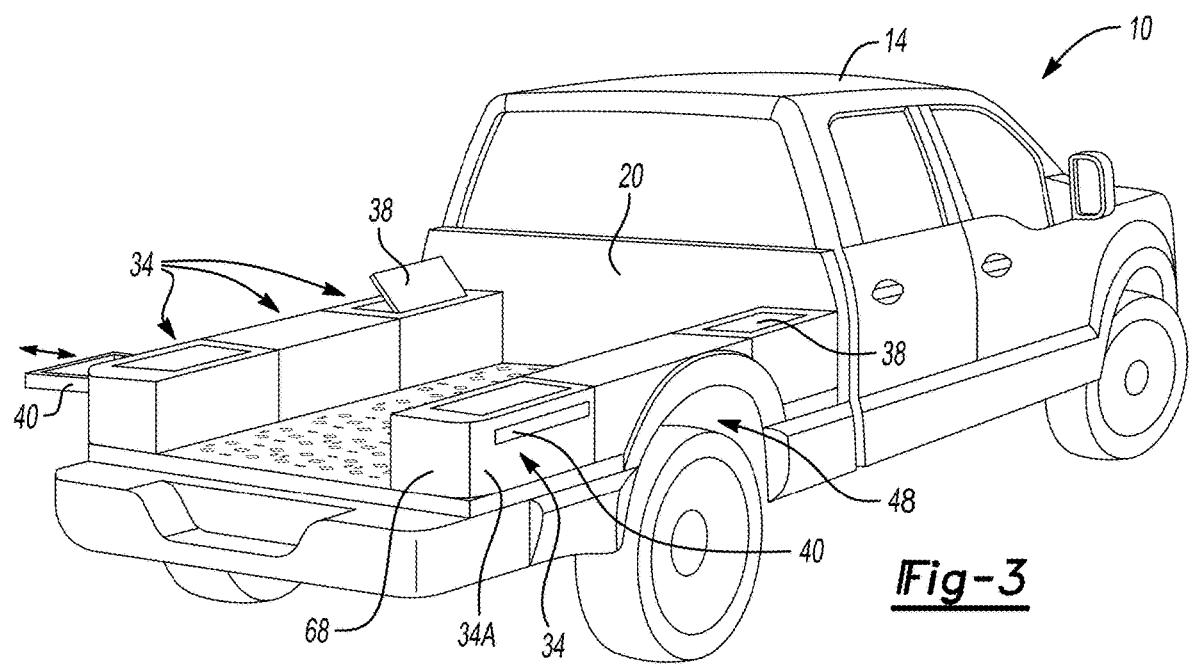
FIG. 3 illustrates the vehicle of FIG. 1 with a plurality of accessory assemblies secured to the flatbed to partition the flatbed by providing a driver side sidewall and a passenger side sidewall.
Figure 4:
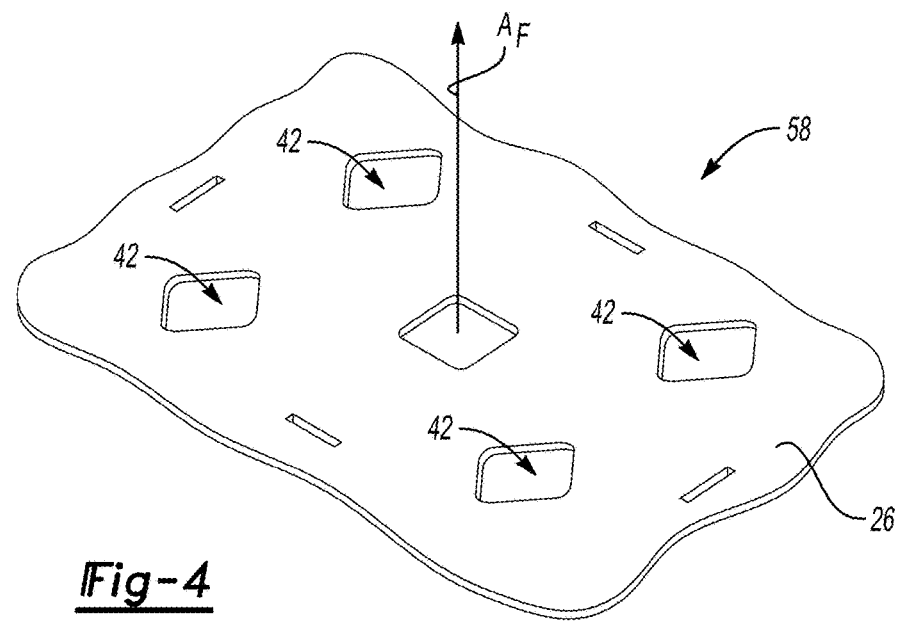
FIG. 4 illustrates a close-up view of an area of the flatbed of the vehicle of FIGS. 1-3.

With reference now to FIG. 3 and continuing reference to FIGS. 1 and 2, an attachment system can be used to secure one or more accessory assemblies 34 to the floor 26 of the vehicle 10. The accessory assemblies 34 can reconfigure the flatbed 18 for a wide variety of uses. Cargo can be managed and secured for transport using the accessory assemblies 34.

For purposes of this disclosure, the accessory assemblies 34 can be considered at least items that utilize the attachment system of this disclosure. The example accessory assemblies 34 can be considered partitioning assemblies as the accessory assemblies 34 can partition areas of the flatbed 18.

In this example, the accessory assemblies 34 are secured to the floor 26 to partition an area of the flatbed 18 and provide a pair of cargo bed sidewalls. Each of the example accessory assemblies 34 is secured to the floor 26 provide a portion of a driver side sidewall, or a portion of a passenger side sidewall.

In this example, a few of the example accessory assemblies 34 include a hinged lid 38. Cargo can be stored within these accessory assemblies 34 and secured by the hinged lid 38. A few other example accessory assemblies 34 include a slidable tray 40 or drawer. Cargo, such as hand tools, can be stored in the slidable tray 40. The slidable tray 40 can also be used as a work surface. A few other example accessory assemblies 34 include a wheel well area 48 for one of the wheels 22.

The accessory assemblies 34 could also include a refrigerator, bicycle or motorcycle racks, ladder racks, kayak racks, lighting stands, camping equipment, wood cutting equipment (e.g., chop saw). Substantially any type of accessory having the requisite attachment interface can be secured to the flatbed 18 of the vehicle 10.

In this example, the accessory assembles 34 are electrically coupled to the vehicle 10 when the engaged with the flatbed 18. In an example, moving the accessory assembly 34 to a position where the accessory assembly 34 is engaged with the floor 26 moves an electrical contact of the accessory assembly 34 into contact with an electrical contact of the vehicle 10. When the electrical contacts are in contact, the accessory assembly 34 is electrically coupled to the vehicle 10.

With reference now to FIGS. 4-8, in the exemplary embodiment, the attachment system includes a plurality of apertures 42 and a plurality of feet 46. The floor 26 of the flatbed 18 provides the apertures 42 in this example.

The apertures 42 are arranged in groups 58. Each group 58 includes four apertures 42 in this example. The apertures 42 in each of the groups are circumferentially distributed about an axis $A_F$ that extends normal to the floor 26. The four apertures 42 within each of the groups 58 are each offset ninety degrees about the axis $A_F$ from the adjacent apertures 42 within that group 58.

The apertures 42 are described as being provided by the floor 26. This attachment interface could be rearranged, however, such that some or all of the feet 46 extend from the floor 26 or baseplates, and the accessory assemblies 34 provide the apertures 42.

In this example, a profile of each of the example apertures 42 is rectangular. Each of the apertures 42 include four corners 44. The apertures 42 are arranged such that one of the corners 44F is a forward corner, one of the corners 44R is a rear corner, one of the corners 44D is a driver side corner, and the other corner is a passenger side corner 44P. Forward and rear are with reference to the general orientation of the vehicle 10.

In the exemplary embodiment, when the accessory assemblies 34 are engaged, the feet 46 are each received within one of the apertures 42 such that the feet 46 each extend from a first side 50 of the floor 26, through one of the apertures 42, and past an opposite, second side 54 of the floor 26.

The accessory assembly 34 includes at least one group 58 of feet 46 that are circumferentially distributed about an axis $A_A$ that extends normal to a bottom surface 62 of the accessory assembly 34. The accessory assembly 34 includes a single group 58 of the feet 46. Other accessories could include more than one group 58 of feet 46.

Each of the groups 58 includes four feet 46 circumferentially distributed about the axis $A_A$. The four feet 46 with each of the groups 58 are each offset ninety degrees about the axis $A_A$ from the adjacent feet 46 within that group 58. The feet 46 each extend from the accessory assembly 34 to an enlarged collar 66, which gives each foot 46 an outwardly extending hook or lip.

Due to the sizing and spacing of the apertures 42 and feet 46, the accessory assembly 34 is configured to engage the floor 26 through the group 58 of apertures 42 when the accessory assembly 34 is in a first position or, alternatively, when the accessory assembly 34 is in a second position where the accessory assembly 34 is rotated ninety degrees clockwise about a vertical axis relative to the first position. In this example, the floor can additionally engage the accessory assembly 34 when the accessory assembly 34 is in a third position that is rotated ninety degrees clockwise from the second position, and when the accessory assembly 34 is in a fourth position where the accessory assembly 34 is rotated ninety degrees from the third position.

The rotation and offset of the accessory assembly 34 between the first, second, third, and fourth positions can be a rotation and offset about the axis $A_A$ or $A_F$, which are vertical axes in this example. The axes could extend in other non-vertical directions if, for example, the apertures 42 were provided in the aft wall 20 (FIGS. 1 and 3) of the passenger compartment 14.

Again, the first, second, third, and fourth positions are all ninety degrees offset from each other. This permits, for example, the accessory assembly 34A to engage a group of apertures 42 in the floor 26 when a given side surface 68 of the accessory assembly 34A is facing rearward as shown, facing forward, facing a driver side, or facing a passenger side. The ability to secure the accessory assembles 34 in a variety of rotational orientations can enhance usability.

The apertures 42, as shown, are distributed across the floor 26 of the flatbed 18. The example accessory assemblies 34 can engage the floor 26 at various positions by engaging different groups 58 of apertures.

A method of attaching the accessory assembly 34 to the flatbed 18 can include sliding the accessory assembly 34 over the floor 28 until each of the feet 46 can be received within one of the apertures 42. The method then includes sliding the accessory assembly 34 a bit more until the enlarged collars 66 of the feet 46 extend beneath the floor 28 and "hook" the accessory assembly 34 to the floor 28. Sliding the feet 46 until the enlarged collars 66 at least partially extend beneath the floor 28 captures part of the floor 28 between the feet 46 and the bottom surface 62 of the accessory assembly 34, which engages the accessory assembly 34 with the floor 28 and blocks withdrawal of the feet 46 from the apertures 42. The sliding of the accessory assembly 34 transitions the accessory assembly 34 from a disengaged position where the feet 46 can be withdrawn from the apertures 42, to an engaged position where the feet 46 are blocked from being withdrawn from the apertures 42.

Figure 5:
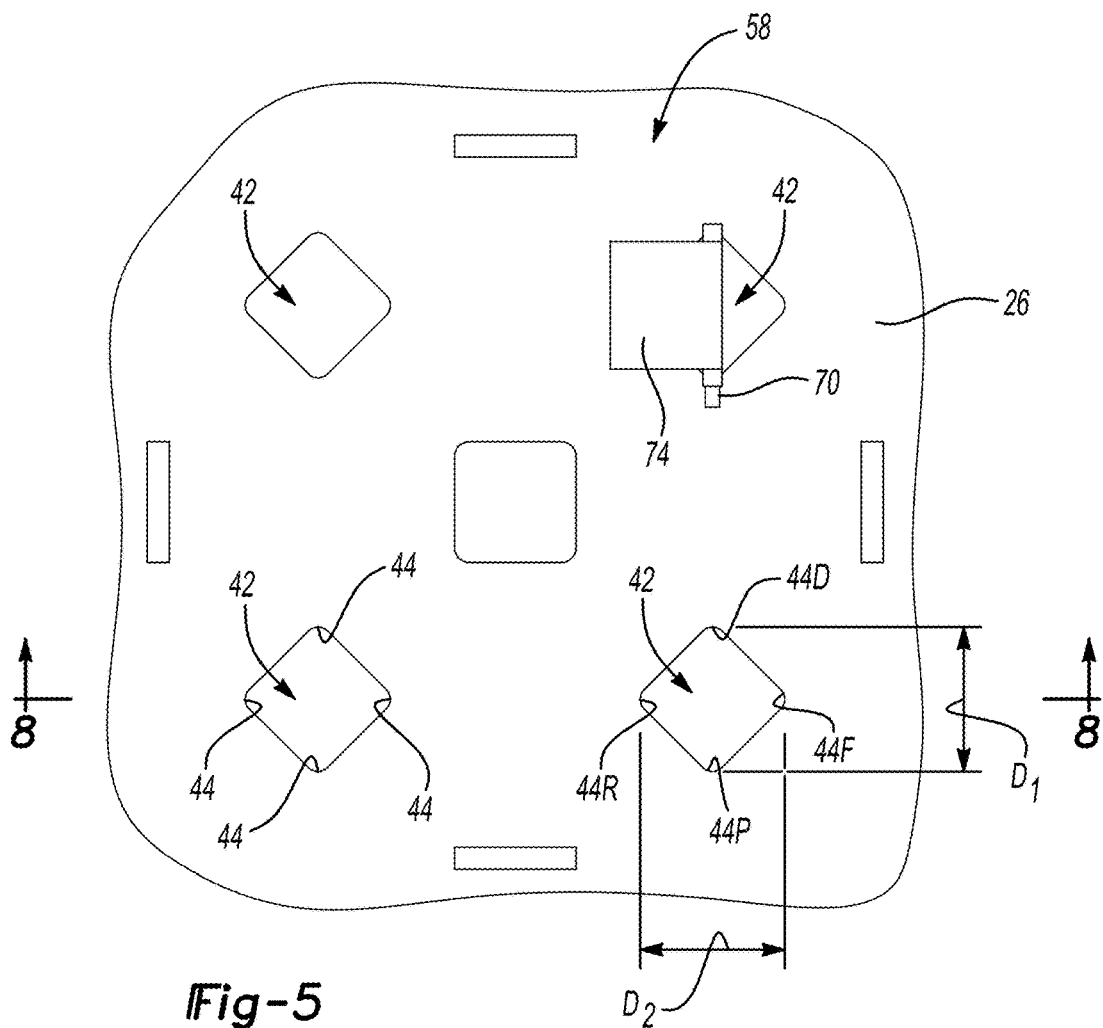
FIG. 5 illustrates a top view of the area of FIG. 4.
Figure 6:
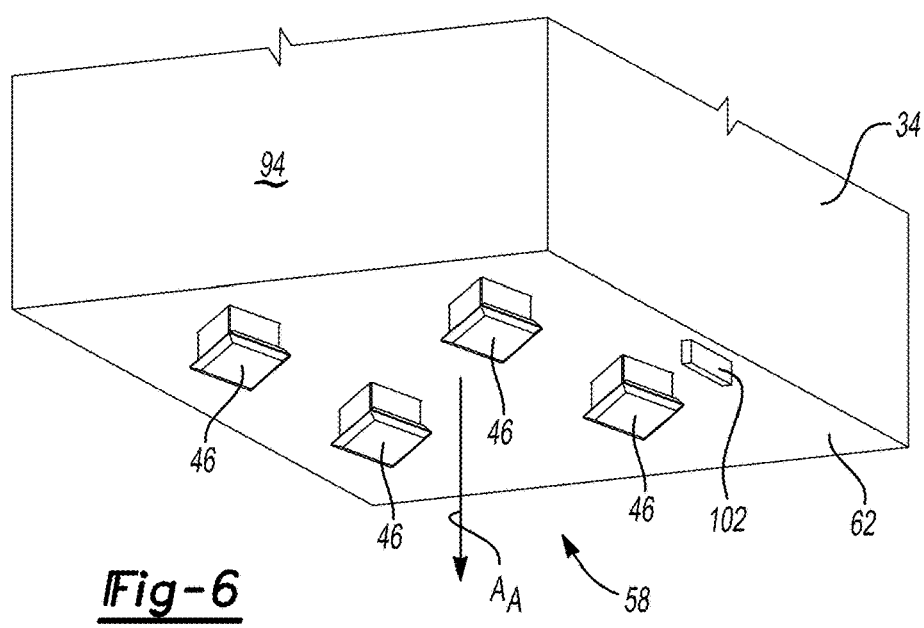
FIG. 6 illustrates a bottom view of an accessory assembly of FIG. 3.
Figure 7:
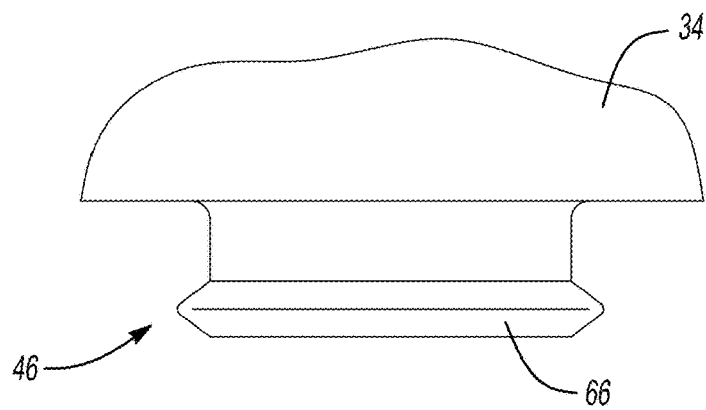
FIG. 7 illustrates a close-up perspective view of a foot of the accessory assembly of FIG. 6.
Figure 8:
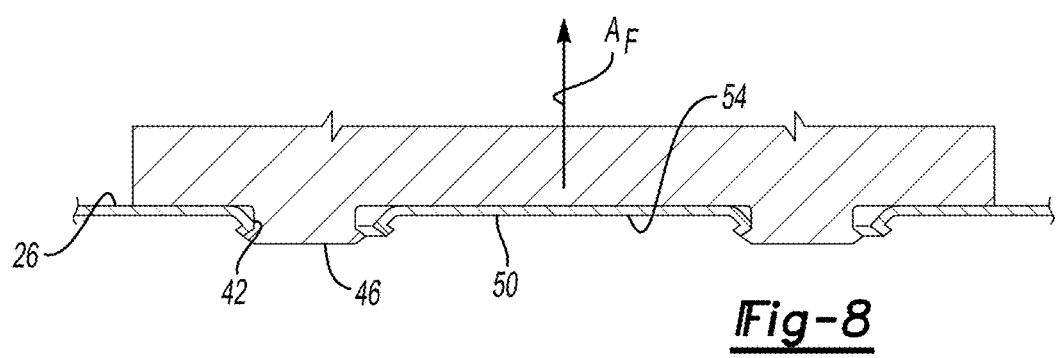
FIG. 8 illustrates a section view taken at line 8-8 in FIG. 5 when an accessory is secured to the apertures within the area.

In addition to the accessory assemblies 34, the apertures 42 can be utilized to connect other types of items to the flatbed 14. For example, the apertures 42 can be sized such that a distance D1 from the forward corner 44F and the rear corner 44R is the same as a distance D2 from the driver side corner 44D to the passenger side corner 44P. The apertures 42 are sized further such that the distances D1 and D2 are suitable for accommodating an E-track connector 70 as shown in FIG. 5.

The E-track connector 70 can be part of an E-track system that is used to help secure cargo carried within the cargo bed 18. The E-track connector 70 can engage the floor 28 to, for example, provide an anchor for a tie down strap 74. The E-track connector can be a tie-down ring, a hook, a socket, etc.

Figure 9:
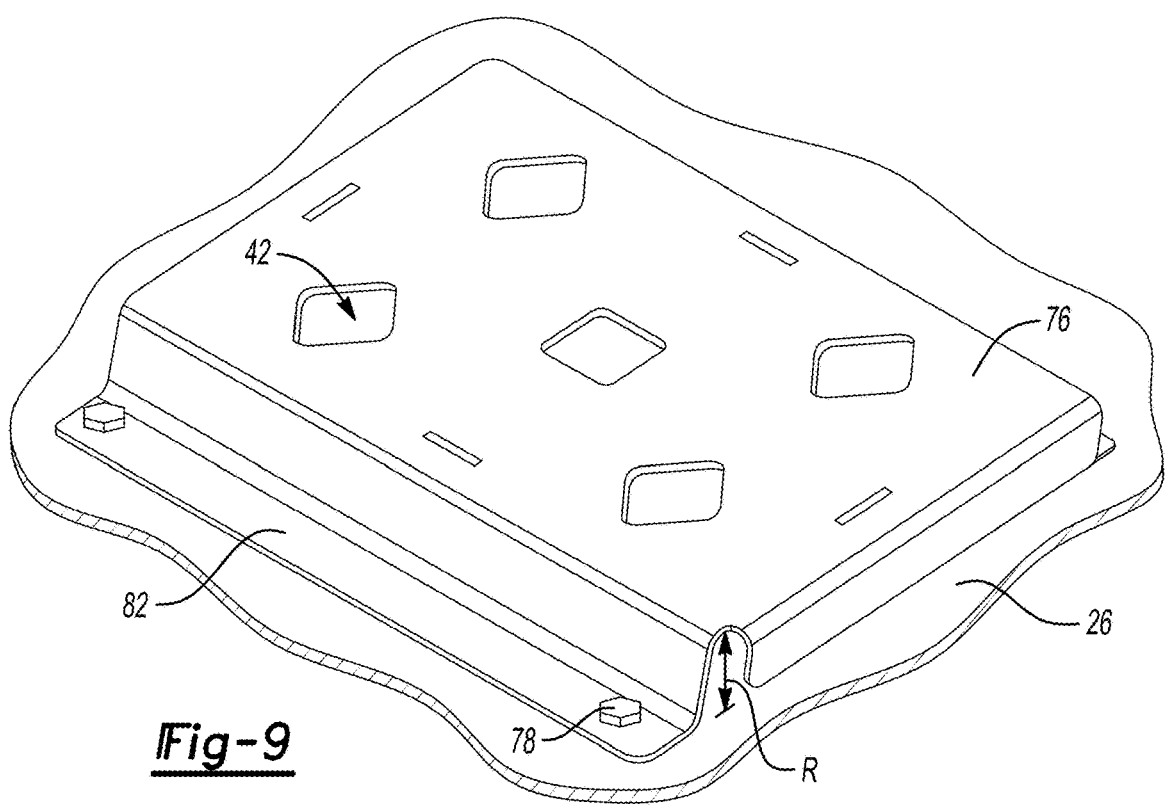
FIG. 9 illustrates a perspective view of a baseplate secured to a floor of the flatbed according to another exemplary aspect of the present disclosure.

With reference to FIG. 9, in another example, a plurality of baseplates 76 are secured to provide the apertures 42 used to connect the accessory assemblies 34 to the flatbed 18 of the vehicle 10. Mechanical fasteners 78, welds, or another attachment could be used to secure peripheral flanges 82 of the baseplates 76 to the floor 28 or to other areas of the vehicle 10.

If one or more of the baseplates 76 is used to provide the apertures 42, areas of the baseplate 76 that provide the apertures 42 can be raised a distance R from the floor 26 when the baseplate 76 is attached to the floor 26. This provides an open area between the floor 26 and the apertures 42. When the baseplate 76 and the accessory assemblies 34 are engaged, the feet 46 extend into the open area. The distance R and, for that matter, the open area, can be sized to facilitate cleaning between the floor 26 and the raised areas of the baseplates 76.

By using different arrangements of baseplates 76, the floor 26 can be configured to accommodate one or more accessory assemblies 34 in various locations. The exemplary attachment system provided by the baseplates 76 is modular and can be adapted to particular needs.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A modular cargo management system for a flatbed vehicle, comprising:
   a flatbed of a vehicle extending rearward from an aft wall of a passenger compartment;
   at least one accessory assembly;
   an attachment system that secures the at least one accessory assembly to the flatbed, the attachment system having a plurality of feet that are each received within one of a plurality of apertures when the at least one accessory assembly is secured to the flatbed, and wherein the plurality of apertures are arranged in groups, with each group comprising a center aperture defining an axis and a sub-set of apertures circumferentially distributed about the axis, and wherein the center aperture has a first orientation relative to the aft wall, and apertures in the sub-set of apertures have a second orientation relative to the aft wall that is different than the first orientation; and wherein each foot is insertable into a respective aperture in a first direction and is slidable relative to the flatbed in one of multiple different second directions that are transverse to the first direction to secure the at least one accessory assembly to the flatbed.

2. The modular cargo management system of claim 1, wherein the at least one accessory assembly provides a cargo bed sidewall when the at least one accessory assembly is secured to the flatbed.

3. The modular cargo management system of claim 1, wherein the at least one accessory assembly includes a hinged lid.

4. The modular cargo management system of claim 1, wherein the at least one accessory assembly includes a slidable tray.

5. The modular cargo management system of claim 1, wherein the at least one accessory assembly is electrically coupled to the vehicle when the at least one accessory assembly is engaged with the flatbed.

6. The modular cargo management system of claim 1, wherein the flatbed includes no sidewalls.

7. The modular cargo management system of claim 1, wherein the at least one accessory assembly includes a wheel well.

8. The modular cargo management system of claim 1, further comprising a floor of the flatbed, wherein, when the at least one accessory assembly is secured to the floor, the plurality of feet extend from a first side of the floor, through one of the plurality of apertures, and past an opposite, second side of the floor.

9. A modular cargo management system for a flatbed vehicle, comprising:
a flatbed of a vehicle extending rearward from an aft wall of a passenger compartment;
at least one accessory assembly;
an attachment system that secures the at least one accessory assembly to the flatbed, the attachment system having a plurality of feet that are each received within one of a plurality of apertures when the at least one accessory assembly is secured to the flatbed;
a floor of the flatbed, wherein, when the at least one accessory assembly is secured to the floor, the plurality of feet extend from a first side of the floor, through one of the plurality of apertures, and past an opposite, second side of the floor;
wherein the plurality of apertures are arranged in groups, with each group comprising a center aperture defining an axis and a sub-set of apertures circumferentially distributed about the axis, and wherein the center aperture has a first orientation relative to the aft wall, and apertures in the sub-set of apertures have a second orientation relative to the aft wall that is different than the first orientation; and
wherein, when the at least one accessory assembly is engaged with the floor, enlarged collars of the plurality of feet capture respective portions of the floor to block withdrawal of the plurality of feet from the plurality of apertures.

10. A modular cargo management system for a flatbed vehicle, comprising:
a flatbed of a vehicle;
at least one accessory assembly;
an attachment system that secures the at least one accessory assembly to the flatbed, the attachment system having a plurality of feet that are each received within one of a plurality of apertures when the at least one accessory assembly is secured to the flatbed, wherein the at least one accessory assembly is configured to engage the flatbed when the at least one accessory assembly is in a first position, and when the at least one accessory assembly is in a second position that is rotated relative to the first position, and wherein, in each of the first position and the second position, the plurality of feet are insertable through the plurality of apertures in a first direction and slidable within the plurality of apertures in a second direction transverse to the first direction; and
wherein, after insertion into a respective aperture, each foot is slidable relative to the flatbed in one of multiple different directions, and wherein sliding the plurality of feet within the plurality of apertures in the second direction further comprises selecting the second direction from the one of multiple different directions.

11. The modular cargo management system of claim 10, wherein a rotation of the at least one accessory assembly from the first position to the second position is rotation about an axis which extends perpendicular to an upper surface of the flatbed.

12. The modular cargo management system of claim 10, wherein the at least one accessory assembly is configured to engage the flatbed in a third position that is different than the first position and the second position, and further configured to engage the flatbed in a fourth position that is different than the first position, the second position, and the third position.

13. A modular cargo management method for a flatbed vehicle, comprising:
receiving a plurality of feet of an accessory assembly within a plurality of apertures to secure the accessory assembly to a flatbed of a vehicle, the accessory assembly providing at least a portion of a cargo bed sidewall when the accessory assembly is secured to the flatbed, and wherein receiving the plurality of feet within the plurality of apertures comprises
inserting the plurality of feet through the plurality of apertures in a first direction, wherein, after insertion into a respective aperture, each foot is slidable relative to the flatbed in one of multiple different directions, and
sliding the plurality of feet within the plurality of apertures in a second direction transverse to the first direction, wherein sliding the plurality of feet within the plurality of apertures in the second direction further comprises selecting the second direction from the one of multiple different directions.

14. The modular cargo management method of claim 13, further comprising providing electrical power to the accessory assembly from the vehicle.

15. The modular cargo management method of claim 13, wherein the accessory assembly includes a wheel well.

16. The modular cargo management method of claim 13, wherein the accessory assembly includes a hinged lid.

17. The modular cargo management method of claim 13, wherein the accessory assembly includes a slidable tray.

18. The modular cargo management method of claim 13, wherein the accessory assembly is configured to engage the plurality of apertures in a floor of the flatbed when the accessory assembly is in a first position, the accessory assembly further configured to engage the plurality of apertures in the floor when the accessory assembly is in a different, second position where the accessory assembly is rotated relative to the first position, wherein rotation of the accessory assembly from the first position to the second position is a rotation about an axis that is normal to the floor.

19. The modular cargo management method of claim 13, wherein the accessory assembly is configured to engage the plurality of apertures in a baseplate that is attached to the flatbed when the accessory assembly is in a first position, the accessory assembly further configured to engage the plurality of apertures in the baseplate when the accessory assembly is in a different, second position where the accessory assembly is rotated relative to the first position, wherein rotation of the accessory assembly from the first position to the second position is a rotation about an axis that is normal to the baseplate.

20. The modular cargo management method of claim 13, further comprising capturing part of the flatbed between the plurality of feet and another portion of the accessory assembly when the accessory assembly is secured to the flatbed.

21. The modular cargo management method of claim 20, wherein the first direction is perpendicular to an upper surface of the flatbed and the second direction is parallel to the upper surface.

22. The modular cargo management method of claim 13, wherein the flatbed extends rearward of an aft wall of a passenger compartment, and including arranging the plurality of apertures in groups, with each group comprising a center aperture defining an axis and a sub-set of apertures circumferentially distributed about the axis, and wherein the center aperture has a first orientation relative to the aft wall, and apertures in the sub-set of apertures have a second orientation relative to the aft wall that is different than the first orientation.

23. A modular cargo management method for a flatbed vehicle extending rearward of an aft wall of a passenger compartment, comprising:
receiving a plurality of feet of an accessory assembly within a plurality of apertures to secure the accessory assembly to a flatbed of a vehicle, the accessory assembly providing at least a portion of a cargo bed sidewall when the accessory assembly is secured to the flatbed, and wherein receiving the plurality of feet within the plurality of apertures comprises
arranging the plurality of apertures in groups, with each group comprising a center aperture defining an axis and a sub-set of apertures circumferentially distributed about the axis, and wherein the center aperture has a first orientation relative to the aft wall, and apertures in the sub-set of apertures have a second orientation relative to the aft wall that is different than the first orientation,
wherein the plurality of apertures are polygonal, and wherein apertures in the sub-set of apertures include at least a forward corner facing the aft wall, a rear corner facing opposite the forward corner, a driver side corner facing one longitudinal side of the vehicle, and a passenger side corner facing opposite the driver side corner, and wherein edges of the center aperture are non-parallel with edges of the apertures in the sub-set of apertures, inserting the plurality of feet through the plurality of apertures in a first direction, and
sliding the plurality of feet within the plurality of apertures in a second direction transverse to the first direction.

24. A modular cargo management system for a flatbed vehicle, comprising:
a flatbed of a vehicle extending rearward from an aft wall of a passenger compartment;
at least one accessory assembly;
an attachment system that secures the at least one accessory assembly to the flatbed, the attachment system having a plurality of feet that are each received within one of a plurality of apertures when the at least one accessory assembly is secured to the flatbed, and wherein the plurality of apertures are arranged in groups, with each group comprising a center aperture defining an axis and a sub-set of apertures circumferentially distributed about the axis, and wherein the center aperture has a first orientation relative to the aft wall, and apertures in the sub-set of apertures have a second orientation relative to the aft wall that is different than the first orientation; and
wherein the plurality of apertures are polygonal, and wherein apertures in the sub-set of apertures include at least a forward corner facing the aft wall, a rear corner facing opposite the forward corner, a driver side corner facing one longitudinal side of the vehicle, and a passenger side corner facing opposite the driver side corner, and wherein edges defining the center aperture are non-parallel with edges defining the apertures in the sub-set of apertures.

* * * * *